United States Patent
Karalis et al.

(10) Patent No.: US 7,341,238 B2
(45) Date of Patent: Mar. 11, 2008

(54) DEVICE FOR LOCKING OUT A PRESSURIZED STORAGE CONTAINER AND METHOD FOR THE SAME

(75) Inventors: Peter Karalis, Watertown, MA (US); Raymond A. Stacy, Framingham, MA (US); Richard Zaven Karadizian, Westford, MA (US); James E. Marquedant, Mendon, MA (US)

(73) Assignee: Kidde-Fenwal Inc., Ashland, MA (US)

( * ) Notice: Subject to any disclaimer, the term of this patent is extended or adjusted under 35 U.S.C. 154(b) by 60 days.

(21) Appl. No.: 11/095,463

(22) Filed: Mar. 30, 2005

(65) Prior Publication Data

US 2006/0220565 A1     Oct. 5, 2006

(51) Int. Cl.
*F16K 25/00* (2006.01)

(52) U.S. Cl. .................. 251/193; 251/89; 280/740; 280/741

(58) Field of Classification Search ............ 169/26–28, 169/56, 68; 137/68.19, 68.27, 554, 625.33; 222/645; 102/222; 251/89, 89.5, 193, 222, 251/223; 280/740–742
See application file for complete search history.

(56) References Cited

U.S. PATENT DOCUMENTS

| | | | |
|---|---|---|---|
| 2,329,315 A | 9/1943 | Allen | 251/159 |
| 3,538,948 A | 11/1970 | Nelson et al. | 137/554 |
| 4,703,915 A | 11/1987 | King | 251/328 |
| 4,972,878 A | 11/1990 | Carlin | 137/625.33 |
| 5,549,278 A * | 8/1996 | Sidler | 251/328 |
| 5,653,423 A * | 8/1997 | Young et al. | 251/328 |
| 5,785,127 A * | 7/1998 | Miller, Sr. | 169/71 |
| 5,890,700 A * | 4/1999 | Clarkson et al. | 251/327 |
| 2003/0205390 A1* | 11/2003 | Karadizian et al. | 169/28 |
| 2004/0051287 A1* | 3/2004 | Parizat et al. | 280/741 |
| 2005/0045846 A1* | 3/2005 | Iwabuchi | 251/193 |
| 2005/0139363 A1* | 6/2005 | Thomas | 169/30 |
| 2006/0016608 A1* | 1/2006 | Simpson et al. | 169/56 |
| 2006/0131350 A1* | 6/2006 | Schechter et al. | 222/645 |
| 2006/0169939 A1* | 8/2006 | Kihara et al. | 251/193 |

FOREIGN PATENT DOCUMENTS

WO    WO 86/00970    2/1986

* cited by examiner

*Primary Examiner*—Thuy V. Tran
*Assistant Examiner*—Tung X Le
(74) *Attorney, Agent, or Firm*—Merchant & Gould P.C.

(57) ABSTRACT

A device and method for locking out an explosion suppressor that includes a discharge valve with a load end and a discharge end. The load end and the discharge end define a discharge path therethrough. The discharge valve includes a side opening transverse of the discharge path. A storage container is connected to the discharge valve at the load end. The storage container delivers a pressurized fluid to the discharge valve through the load end when the system is in a discharge mode. A lockout member is removably insertable into the side opening. The lockout member mechanically blocks the discharge path, whereby the lockout member prevents inadvertent fluid discharge through the discharge end of the discharge path. The presence of the lockout member is monitored by a magnetic switch.

38 Claims, 5 Drawing Sheets

DEVICE FOR LOCKING OUT A PRESSURIZED STORAGE CONTAINER AND METHOD FOR THE SAME

FIELD OF INVENTION

The invention relates to a device for locking out a pressurized storage container used as an explosion suppressor in an explosion suppression system and method for the same. More particularly, the invention relates to a device and method for locking out an explosion suppressor (also referred to as an extinguisher) of an explosion suppression system employing a lockout plate and a magnetic switch that prevents arming of the system with the lockout plate installed.

BACKGROUND OF INVENTION

A variety of fire and explosion suppression suppressors are known. For example, conventional approaches employ pressurized storage containers with a suppressing agent contained therein, and that are fitted with discharge valves. However, improvements may be made in some systems that do not provide optimum safety measures for preventing the release of stored energy from the storage container, and namely by suitably blocking the discharge path from the discharge valve. These shortcomings can pose hazardous conditions for workers performing maintenance in protected vessels in the event of an inadvertent discharge. Furthermore, inadvertent discharges may occur during storage, maintenance or transport of the suppressor when not intended for use.

This may be of concern, since federal law requires that some devices provide a means to mechanically prevent the release of stored energy into an occupied area. Furthermore there is a need for users to be able to lock that device in place for the duration of the occupation. For example, explosion suppression systems may require safe entrance into an area of operation, such as protected vessels including but not limited to process vessels such as dust collectors, dryers, and cyclones. In certain applications, including but not limited to the aforementioned explosion suppression, a means for locking out suppressors is desirable for maintenance and transport conditions. For example, it may sometimes be necessary to mechanically lockout the system from inadvertent discharge during standby by blocking the discharge path.

SUMMARY OF THE INVENTION

It is the purpose of the present invention to overcome these difficulties, thereby providing an improved device and method for locking out an explosion suppression system. Particularly, it is the purpose of the present invention to provide a lockout device that electro-mechanically disarms an explosion suppression system when the lockout device is fully installed in a suppressor. It is the further purpose of the present invention to provide for removing the mechanical lockout, so as to enable operation and arming of the system.

An exemplary embodiment of an explosion suppression system in accordance with the principles of the present invention includes suppressors equipped with a lockout device. The lockout device includes a discharge valve having a load end and a discharge end. The load and discharge ends define a discharge path therethrough. The discharge valve includes a side opening transverse of the discharge path.

The lockout device further includes a lockout member removably insertable into the side opening. When installed, the lockout member mechanically blocks the discharge path, wherein inadvertent fluid discharge through the discharge end is prevented.

The explosion suppression system further includes a storage container connected to the discharge valve at the load end. The storage container containing a pressurized fluid deliverable to the discharge valve through the load end when in the explosion suppression system is in a discharge mode.

An exemplary embodiment of a lockout device in accordance with the principles of the present invention includes a lockout member defining an elongated portion. The elongated portion substantially blocks the discharge path.

In yet another embodiment of a lockout member, a securing portion is included thereon. The securing portion enabling the lockout member to be removably secured to the discharge valve.

In yet another embodiment of a lockout device a magnetic switch is disposed on the discharge valve and proximate the side opening. Preferably, the magnetic switch communicates with an operating member insertable into the side opening when the lockout member is not inserted. The operating member includes a magnet detectable by the magnetic switch. More preferably, the magnetic switch closes when the magnet is detected so as to allow arming of the explosion suppression system. Preferably, the operating member is insertable into the side opening only when the lockout member is removed from the side opening.

In yet another embodiment of a lockout device, a lockout cable is connectable to the lockout member to retain the lockout member in the side opening. The lockout cable may have provisions to be secured in place by a padlock.

An exemplary method for locking out an explosion suppression system includes providing suppressors equipped with a discharge valve with a load end and a discharge end defining a discharge path therethrough. The method also includes providing a storage container connected to the discharge valve at the load end. The storage container contains a pressurized fluid therein that is deliverable to the discharge valve through the load end when the discharge valve is in a discharge mode.

The method further includes disposing a side opening transverse of the discharge path.

The method includes inserting a lockout member into the side opening, and mechanically blocking the discharge path when the lockout member is inserted. The lockout member prevents inadvertent fluid discharge through the discharge end of the discharge path.

The method includes that the lockout member may be removably secured to the discharge valve.

In yet another embodiment of a method for locking out an explosion suppression system, a magnetic switch is disposed on the suppressor's discharge valve and proximate the side opening. The magnetic switch communicates with an operating member that is insertable into the side opening when the lockout member is not inserted. The operating member includes a magnet detectable by the magnetic switch. Preferably, the magnetic switch activates when the magnet is detected so as to allow arming of the explosion suppression system.

Preferably, the operating member is insertable into the side opening only when the lockout member is removed from the side opening.

In yet another embodiment of a method for locking out an explosion suppression system, a lockout cable is connected to the lockout member, so as to retain the lockout member in the side opening. The lockout cable weaves through a hole of the lockout member and wraps around the discharge valve.

The present invention provides an improved explosion suppression system. More particularly, the present invention provides a lockout device for the suppressors of an explosion suppression system that prevents inadvertent discharge of fluid into the protected area. For example, when installed in the side opening of the discharge valve, the lockout member serves as a mechanical block of the discharge path. Due to the opened state of the magnetic switch the explosion suppression system cannot be armed for fluid discharge. In this configuration, the lockout device improves safety to workers, and reduces storage and transportation concerns, thereby protecting system users and those in proximity of the system.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

Like reference numbers generally indicate corresponding elements in the figures.

DETAILED DESCRIPTION OF THE PREFERRED EMBODIMENT

Figure 1A:
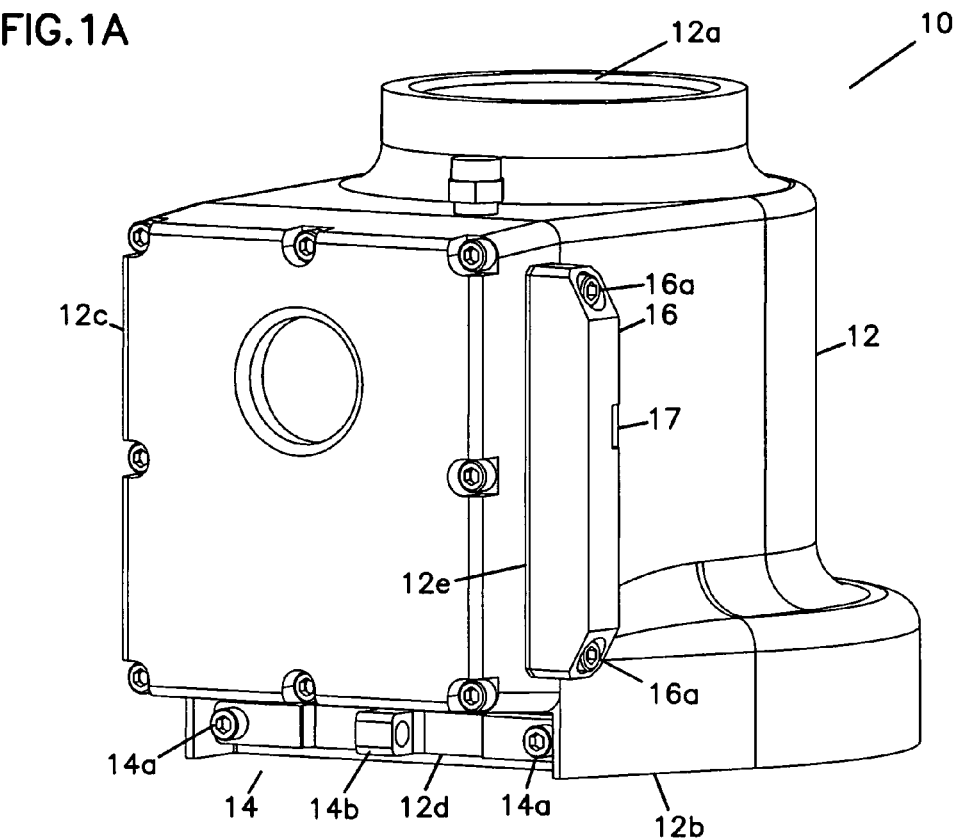
FIG. 1A illustrates an elevational perspective view of one exemplary embodiment of a lock out device used in an exemplary embodiment of a suppressor in accordance with the principles of the present invention. As shown, the lockout device illustrates an exemplary embodiment of a lockout member installed
Figure 1B:
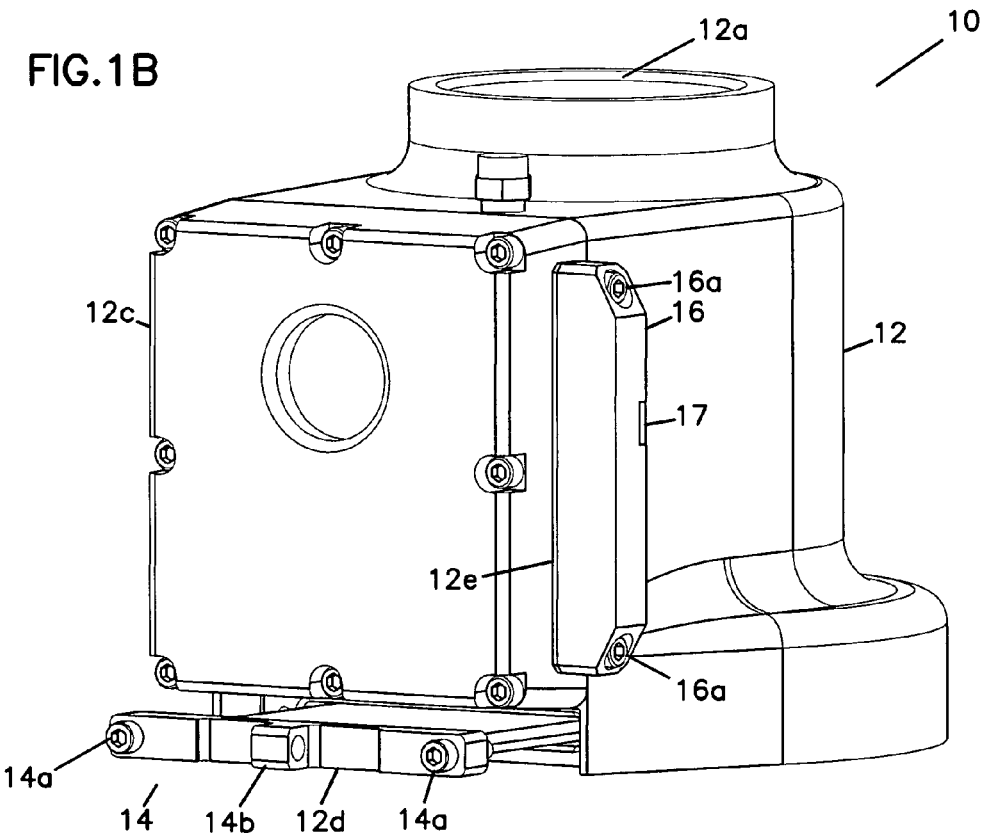
FIG. 1B illustrates an elevational perspective view of the lockout device and suppressor of FIG. 1A and showing the lockout member partially removed.
Figure 1C:
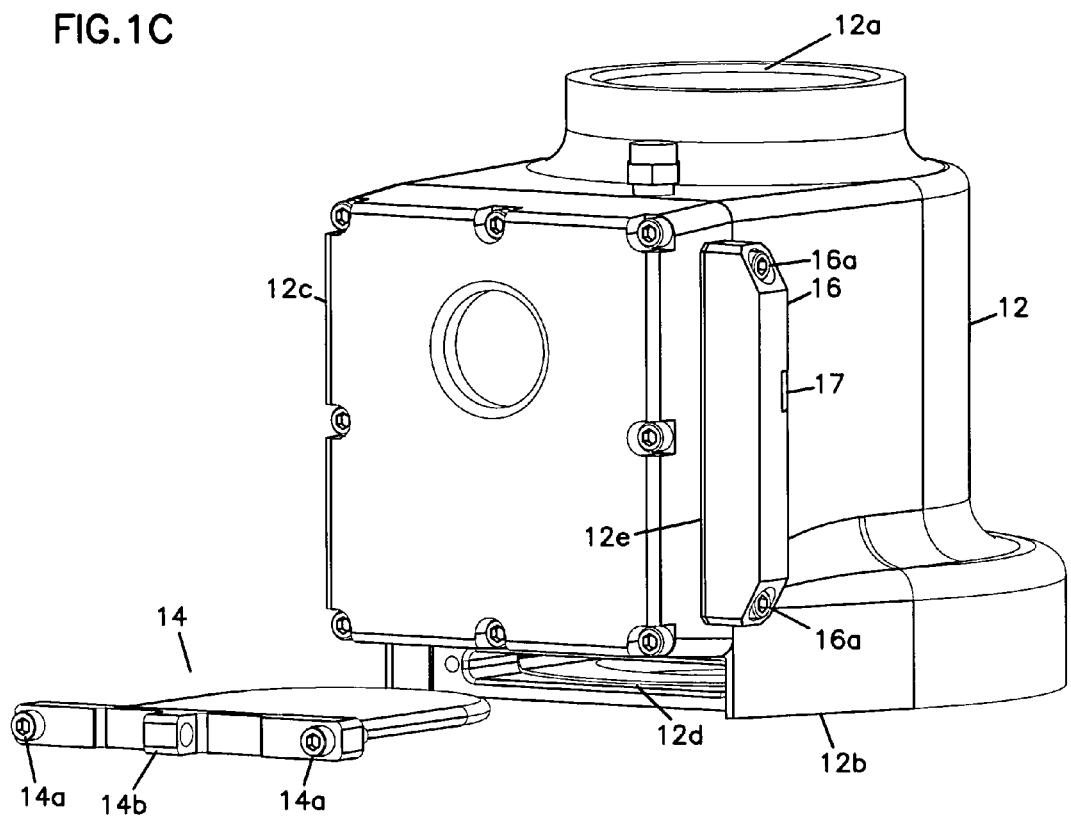
FIG. 1C illustrates an elevational perspective view of the lockout device and suppressor of FIG. 1A and showing the lockout member fully removed.
Figure 2:
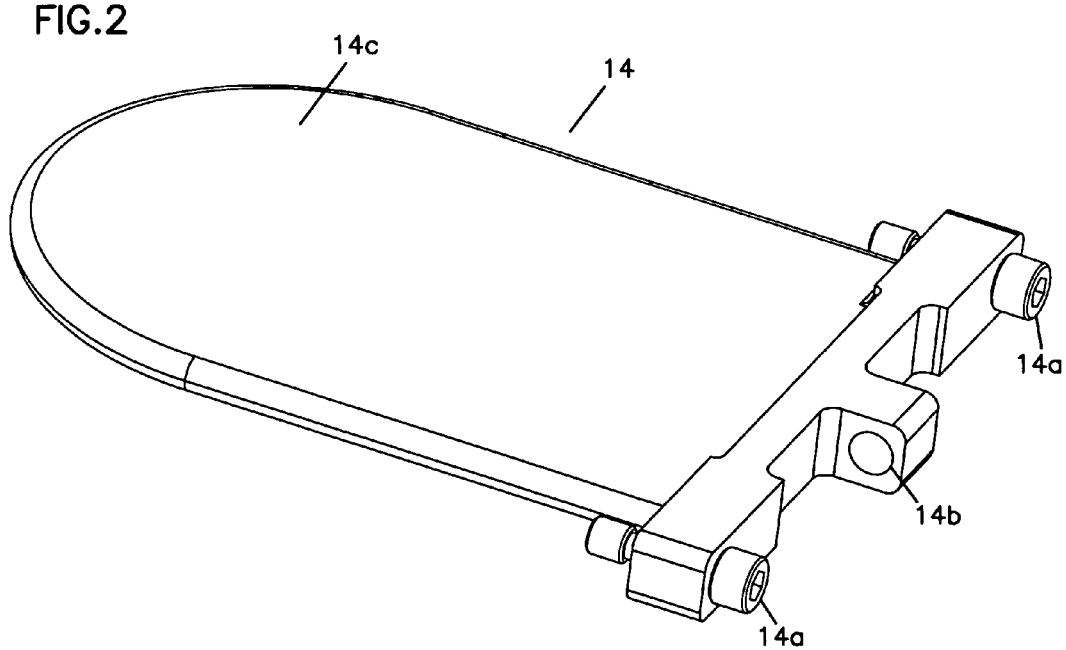
FIG. 2 illustrates an elevational perspective view of the lockout member of FIG. 1A alone.

With regard to FIGS. 1A-1C, a suppressor 10 with a lockout device in accordance with the principles of the present invention is shown.

As illustrated, the lockout device includes a discharge valve 12 with a load end 12a and a discharge end 12b. The load end 12a and the discharge end 12b define a discharge path 12f therethrough (best shown in FIG. 3). As one preferred example, the lockout device is used with discharge valves of fire and explosion extinguishers/suppressors that deliver suppressing fluid. However, the lockout device may be used with any valve that releases stored energy. Preferably, the discharge valve 12 is manufactured from a corrosive resistant material, including but not limited to stainless steel and aluminum. The suppressor 10 also includes a storage container 18 containing a pressurized fluid for delivery through the discharge path 12f of the discharge valve 12. The storage container 18 is best shown as a partial view of FIG. 4. Preferably, the storage container 18 is a cylinder shaped tank connected to the load end 12a of the discharge valve 12. It will be appreciated, however, that the suppressor 10 is adaptable for use with any number of storage containers housing a pressurized agent and of different size. Preferably, the storage container is made from a rigid material including but not limited to carbon steel.

The discharge valve 12 includes a side opening 12d. The side opening 12d is transverse of the discharge path 12f. Preferably, the side opening 12d is a slot transverse of the discharge path 12f and disposed proximate the discharge end 12b. It will be appreciated that the shape and disposition of the side opening 12d is merely exemplary. For example, other shapes than the slot shown, and other dispositions for the side opening 12d than proximate the discharge end 12b may be equally suitable.

A lockout member 14 is removably insertable into the side opening 12d. The lockout member 14 mechanically blocks the discharge path 12f. When installed as shown in FIG. 1A, the lockout member 14 prevents inadvertent fluid discharge through the discharge end 12b of the discharge path 12f. Typically, the discharge valve 12 may include a burst seal or rupture disc (not shown) disposed therein for sealing the discharge path 12f. Whereby, the lockout member 14 may be disposed under the burst disc and proximate the discharge end 12b. The lockout member 14 serves as a safety block in the event the seal is broken or ruptured. A burst seal may be a metallic burst disk, and may be mechanically attached within the discharge valve. Such burst seals are well known and not further described.

Figure 3:
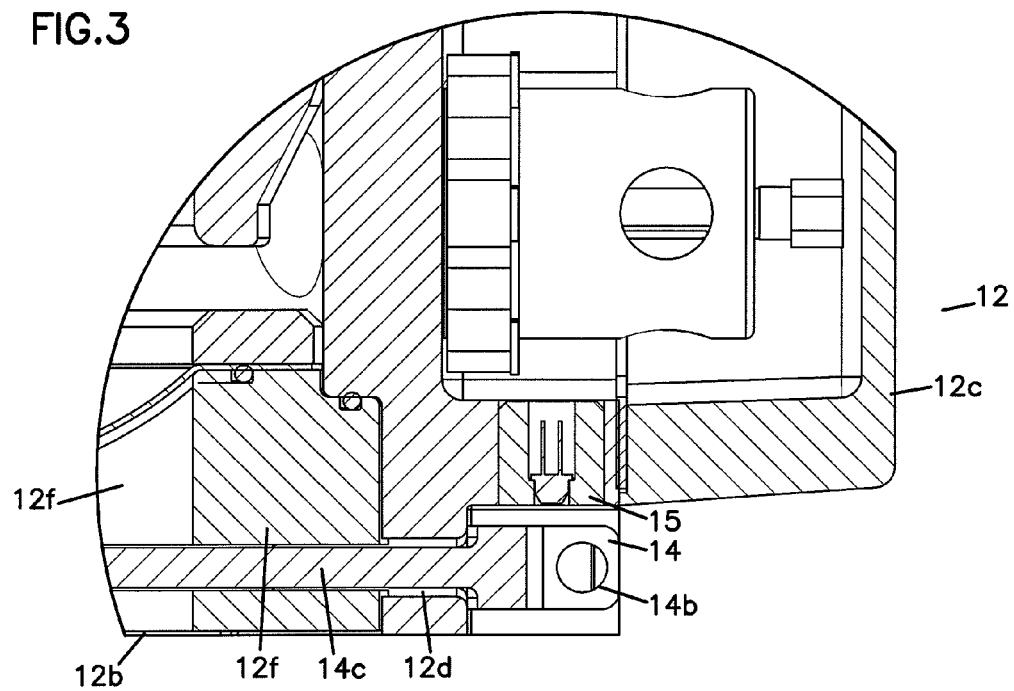
FIG. 3 illustrates a partial side sectional view of the lockout device and suppressor of FIG. 1A, and showing an exemplary embodiment of a magnetic switch in relation to the lockout plate when installed.
Figure 4:
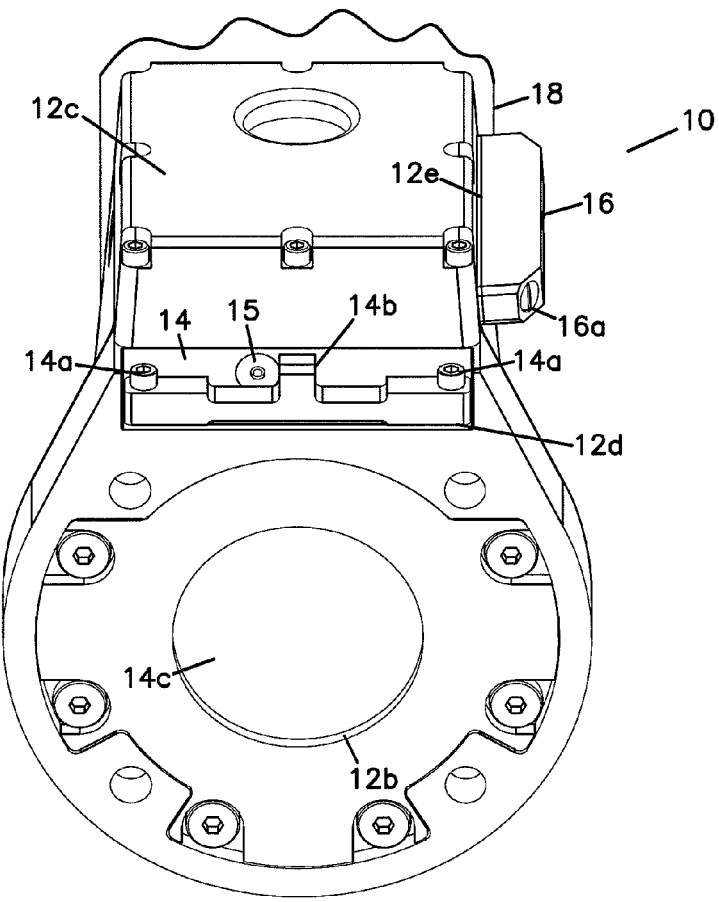
FIG. 4 illustrates a perspective elevational view of the lockout device and suppressor of FIG. 1A, and showing the lockout plate installed and blocking a discharge path.

Preferably, the lockout member 14 defines an elongated portion 14c. The elongated portion 14c provides a surface that substantially blocks the discharge path 12f. Preferably, the elongated portion 14c defines a plate portion. The plate may be a tongue-shaped surface that is sized to substantially block the discharge path 12f. It will be appreciated that this configuration is merely exemplary, as the surface of the elongated portion 14c may be shaped in any number of ways so as to slide or be inserted into the side opening 12d. As best shown in FIGS. 1A, 3 and 4, the elongated portion 14c blocks the discharge path 12f proximate the discharge end 12b.

The lockout member 14 further includes a securing portion 14a. The securing portion 14a enables the lockout member 14 to be removably secured to the discharge valve 12. Preferably, the securing portion 14a includes a bolt pattern. The bolt pattern may be configured as two opposing bolt holes. The bolt pattern then matches a bolt pattern 12g of the discharge valve 12, so as to secure the lockout member 14 to the discharge valve 12 using bolts. It will be appreciated that the securing portion 14a may be designed to leave a sufficient leakage space around its edges. Particularly, FIG. 1A shows the lockout member 14 fully installed in the side opening 12d. FIG. 1B shows the lockout member 14 partially removed from the side opening 12d. FIG. 1C shows the lockout member 14 fully removed from the side opening 12d.

Figure 5:
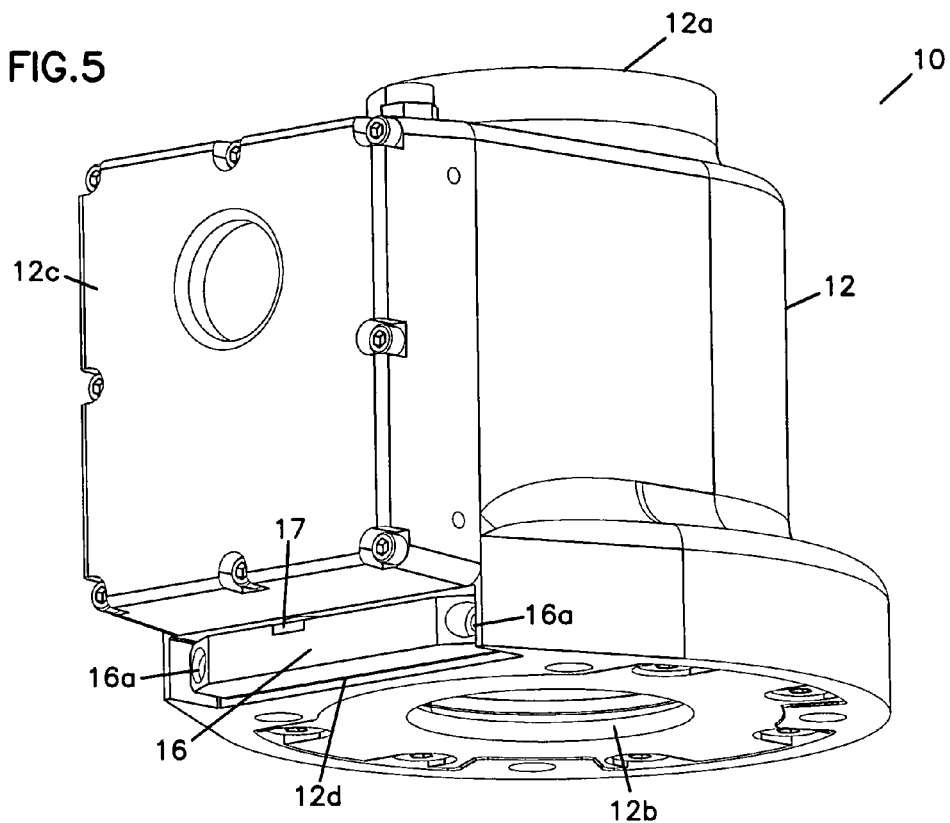
FIG. 5 illustrates an elevational perspective view of the suppressor of FIG. 1A and showing an operating plate installed.
Figure 6:
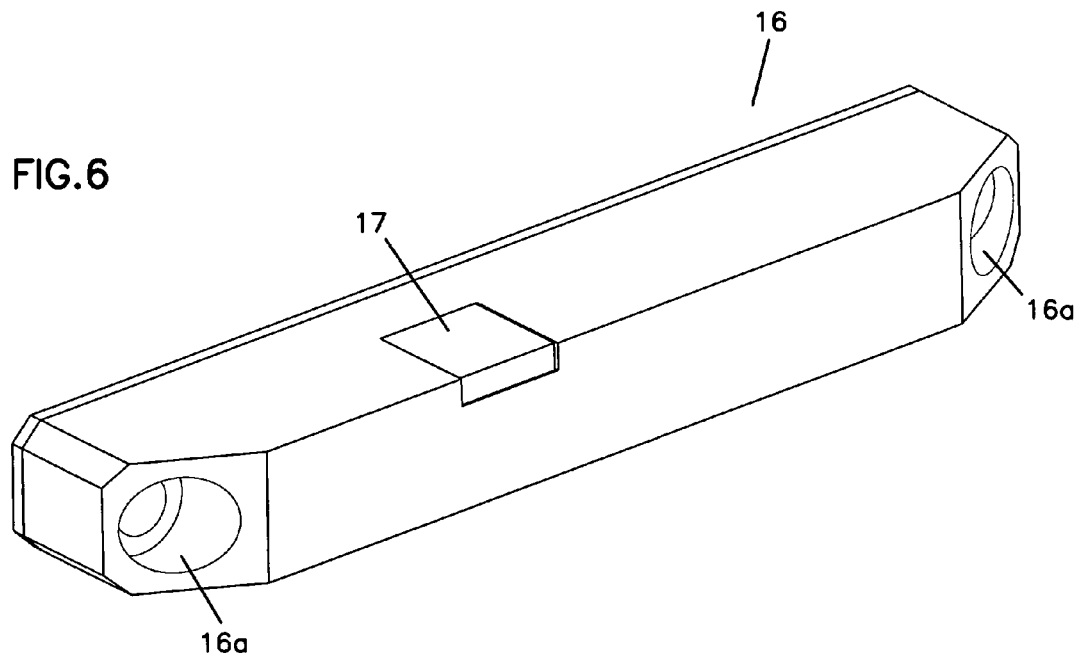
FIG. 6 illustrates an elevational perspective view of the operating plate of FIG. 5 alone.

Turning to FIGS. 5 and 6, an operating member 16 may be used to allow operation of the suppressor 10 for fluid discharge. One preferred embodiment of an operating member 16 is shown in FIGS. 5-6. When the lockout device is not in use, namely when the lockout member 14 is fully removed, the operating member 16 may replace the lockout member 14. Preferably, the operating member 16 is insertable into the side opening 12d only when the lockout member 14 is removed therefrom.

The operating member 16 does not mechanically block the discharge path 12f, so as to allow operation of the suppressor 10 for fluid discharge. Turning specifically to FIG. 6, the operating member 16 is shown as a bar or narrow plate. The operating member 16 includes no elongated portion to block the discharge path 12f. The purpose of the operating member 16 is to block the side opening 12d. Thus, the operating member 16 is shorter than the lockout member 14 at least in the inserting direction of the two members.

Similar to the lockout member 14, the operating member 16 includes a securing portion 16a. Preferably, the securing portion 16a is a similar bolt pattern to the lockout member 14, defining two opposing bolt holes that enable securing of the operating member 16 to the bolt pattern 12g of the discharge valve 12.

Particularly, FIG. 5 shows the operating member 16 installed. FIG. 6 shows the operating member 16 individually.

Turning back to FIGS. 1A-1C, when the lockout member 14 is not installed, or at least when the operating member 16 is not installed (as in FIG. 5), the operating member 16 may be conveniently attached to an enclosure 12c of the discharge valve 12. Preferably, the enclosure 12c is disposed at a side of the discharge valve 12. The enclosure 12c may include its own bolt pattern, so as to be secured to mating bolt pattern (not shown) of the discharge valve 12. As illustrated, the bolt pattern of the enclosure 12c is arranged around a perimeter thereof. However, it will be appreciated that this bolt pattern is merely exemplary. Other dispositions of a bolt pattern may be equally suitable for securing the enclosure 12c to the discharge valve 12. Furthermore, the box-like shape of the enclosure 12c is merely exemplary. Other shapes for an enclosure may be equally suitable.

An enclosure side bolt pattern 12e may be disposed on a side of the enclosure 12c. The side bolt pattern 12e allows storage of the operating member 16 when the explosion protection system is not in operation. The side bolt pattern 12e provides a means for the operating member 16 to be bolted to the enclosure 12. The enclosure 12c may also cover an actuating mechanism, pressure switch, pressure gauge, fill valve and other wiring connections. These features are well known in and typically used for applications employing a valve body for pressurized storage container discharge, and are not illustrated in the present Figures.

In operation, the lockout device utilizes a lockout member 14, which slides into the side opening 12d and bolts into place. Preferably, the lockout member 14 is secured in place by its securing portion 14a that can include two bolts. The lockout member 14 fits with the bolt pattern 12g of the discharge valve 12, such that the lockout member 14 can be installed and uninstalled while the suppressor 10 is safely installed. This feature also allows the lockout member 14 to additionally serve as a safety plate for shipping and handling. When installed, the lockout member 14 may also leave sufficient leakage space around the edges of the securing portion 14a for stored energy to be safely released to the surrounding environment in the event of an inadvertent discharge.

When the lockout provision is not in use, the lockout member 14 can be replaced by an operating member 16. The operating member 16 covers and seals the side opening 12d or slot left by the missing lockout member 14. It is attached via the same bolt pattern. The operating member 16 can be self stored on the enclosure 12c using side bolt pattern 12e, and can be manually installed once the lockout member 14 is removed.

Turning back to FIGS. 5-6 and to FIG. 3 a supervisory switch prevents arming of the explosion protection system when the lockout member 14 is installed in the side opening 12d. The supervisory switch also allows activation and arming of the system 10 when the operating member 16 is installed in the side opening 12d. Preferably, the supervisory switch is a magnetic switch. One preferred embodiment of the magnetic switch 15 is illustrated in Detail A of FIG. 3. Preferably, the magnetic switch 15 is disposed on the discharge valve 12 and proximate the side opening 12d at the discharge end 12b. FIG. 3 illustrates the suppressor 10 in a disarmed state. FIG. 3 shows a view of the disposition of the magnetic switch 15, such that when the lockout member 14 is installed, fluid discharge is blocked and arming of the system is prevented.

Turning specifically to FIG. 5, the magnetic switch 15 communicates with the operating member 16 when it is bolter over the side opening 12d. This happens when the lockout member 14 is removed. As best shown in FIG. 6, the operating member 16 includes a magnet 17 disposed on an outer surface of the operating member 16. Preferably, the magnet 17 is detectable by the magnetic switch 15 so as to indicate to the explosion protection system that the suppressor 10 is operable and arming and activation are enabled. It will be appreciated that the magnet may be disposed in a different manner other than on the outer surface of the operating member 16. This arrangement is merely exemplary, and the magnet, for example, may be embedded in the operating member 16.

In operation, the magnetic switch 15 activates when the magnet 17 is detected so as to allow arming of the explosion suppression system. As previously discussed, the operating member 16 does not mechanically block the discharge path 12f. Preferably, the magnet 17 is disposed in a position detectable and within range of the magnetic switch 15. It will be appreciated that the magnet 17 is disposed in a proximity and distance from the magnetic switch 15 that is suitable for communicating and sensing therewith. Disposition of the magnet 17 is only limited to the sensing strength of the magnetic switch 15 and flux emitted from both the magnetic switch 15 and magnet 17.

This supervisory switch provides an additional safety measure. The magnetic switch 15 serves as the supervisory switch that can be used to detect the presence of the operating member 16. In operation, the magnet 17 may be disposed on the operating member 16 in such a position that when the operating member 16 is installed in the discharge valve 12, the magnetic switch 15 may activate and send a signal back to a control panel (not shown) that allows arming of the explosion suppression system. The magnetic switch 15 itself might also be a magnet having a circuit for transferring a detection signal or lack thereof to a control panel to indicate the state of the suppressor 10.

It will be appreciated that the supervisory switch being a magnetic switch is merely exemplary. For example, other well known sensory systems may be employed and equally suitable. Furthermore, the supervisory switch may or may not employ a sensory mechanism, and may include a mechanical indicator that signals a user the state of the suppressor 10.

It will be appreciated that the magnet being disposed on the operating member 16 is merely exemplary. For example, the lockout member 14 may include the magnet 17 disposed thereon to communicate with the magnetic switch 15. In this configuration, the magnetic switch 15 would disarm the system 10 by sensing the lockout member 14 instead of the operating member 16. The operating member 16 would be lacking the magnetization, therefore not activating the magnetic switch 15.

Thus, the magnet 17 may be disposed on either the lockout member 14 or operating member 16 in such a position, that when the appropriate member is installed in the discharge valve 12, the explosion suppression system may be respectively disarmed or armed, whichever is appropriate for the application desired.

Figure 7A:
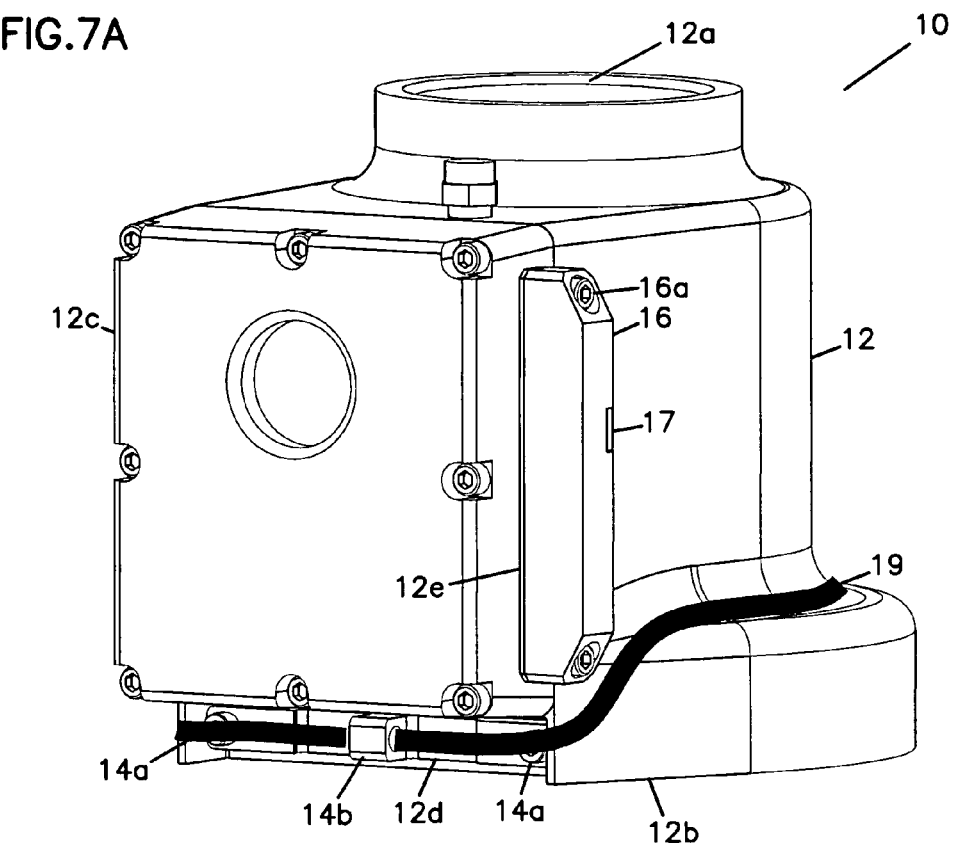
FIG. 7A illustrates an elevational perspective view of the lockout device and suppressor of FIG. 1A and showing an embodiment of a lockout cable wrapped around the suppressor.
Figure 7B:
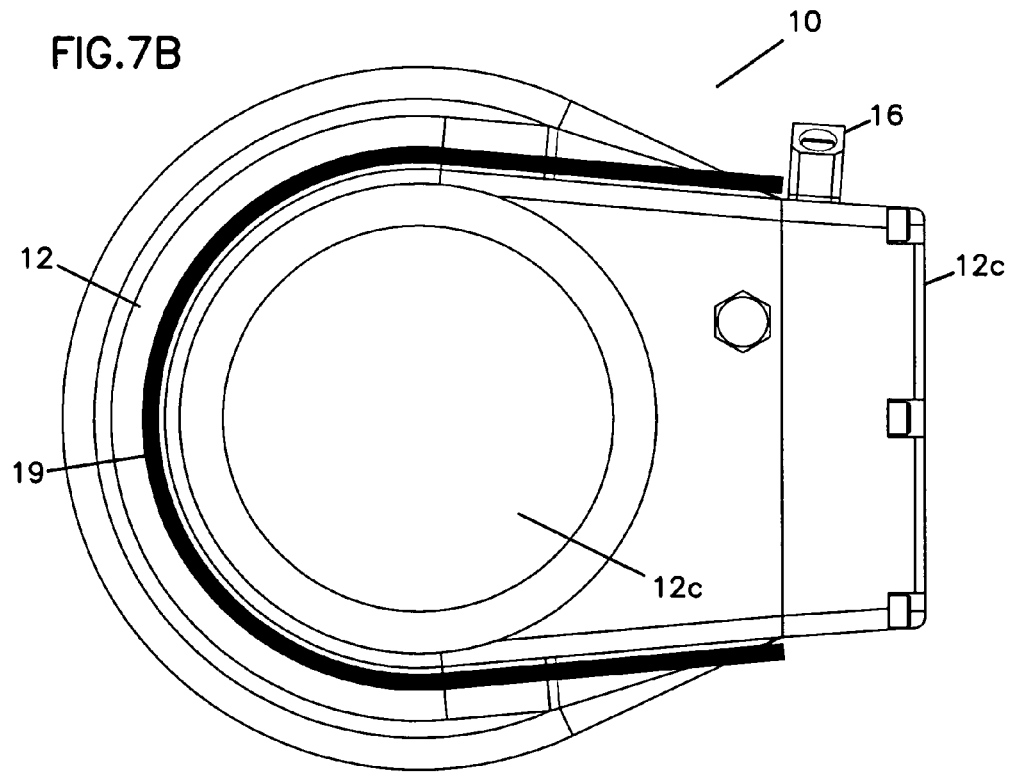
FIG. 7B illustrates an elevational top view of the lockout device and suppressor of FIG. 1A and showing the lockout cable wrapped around the suppressor.

Turning to FIGS. 7A and 7B, a preferred embodiment of a lockout cable 19 is shown. The lockout cable 19 is connectable to the lockout member 14 to retain the lockout member 14 in the side opening 12d. The lockout cable 19 can be weaved or fed through a hole 14b of the lockout member 14. The lockout cable 19 may then be wrapped around the discharge valve 12. The lockout cable 19 may be locked with a padlock (not shown). However, this is merely exemplary. The lockout cable 19 may or may not employ an additional lock and may or may not employ a padlock specifically.

It will be appreciated that for certain embodiments, the suppressor 10 will remain in a standby state for long periods of time with the operating member 16 installed and the explosion suppression system armed. As explosions generally are rare, the suppressor 10 may spend the great majority of its time in the standby state, without actually operating so as to discharge fluid. Indeed, it may be that such a suppressor 10 is never activated to suppress an explosion.

For purposes of description, the suppressor 10 has been considered to be for use as explosion suppression apparatus, and more particularly for use with devices that inhibit, suppress, or extinguish flames and/or explosions. However, such an arrangement is exemplary only. Other applications for the suppressor 10 may be employed and equally suitable. Furthermore, the suppressor 10 may be employed with any number of control panels and detectors for operation. More preferably, the lockout device is used to promote safe entrance into protected process vessels. Preferably, the suppressor 10 is designed for use in Class II, Division I areas and outdoor applications. However, it will be appreciated that these applications are merely exemplary.

Preferably, the suppressor 10 operates in a temperature range of −30° F. to 140° F. (−34° C. to 60° C.). Preferably, the system 10 operates in a pressure range of 700 to 1040 psig, and at a nominal pressure of 900 psig at 70° F. However, it will be appreciated that these operating conditions are exemplary as other operating parameters may equally or more suitable as desired for system use and application.

Preferably, the suppressor 10 is scaled for 4 kg, 10 kg and 20 kg cylinder discharging. Accordingly, the system 10 may respectively define a height of approximately 23.2 inches, 29.8 inches, and 40.5 inches. A width or diameter of the bottom flange of the discharge valve 12 may be defined at approximately 10.0 inches. Finally, the storage cylinder 18 may respectively define a diameter of approximately 5.5 inches, 8.0 inches, and 9.0 inches. It will be appreciated, however, that these dimensions are exemplary only, as other dimensions may be equally or more suitable as desired in certain applications.

It is noted that the term "fluid" sometimes is used to denote only a liquid or a gas. This is not the case herein. With regard to the exemplary embodiment of the suppressor 10, which may be used in explosion suppression devices generally, the term "fluid" is used herein in a broad sense, and should be considered to include any substance that may be made to flow. This includes, but is not limited to, liquids, gases, granular or powdered solids, foams, mixtures or emulsions of two or more fluids, suspensions of solids within liquids or gases, etc.

Thus, although liquids and gases are by no means excluded from use with the suppressor 10 in accordance with the principles of the present invention, certain embodiments thereof may discharge fluids that do not necessarily include either liquids or gases. In addition, although for simplicity the suppressor 10 is described herein as discharging a single fluid, this is not necessarily the case. Two or more fluids may be discharged, simultaneously or in sequence.

Furthermore, the fluid or fluids discharged may be compressible or incompressible, or a mixture of both. The type of fluid for explosion suppression suitable fluids, for example, may include but are not limited to HFC-227ea (1,1,1,2,3,3,3-Heptafluroropropane $CF_3CHFCF_3$) and other hydrofluorocarbons, HALON® 1301 (bromotrifluoromethane $CBrF_3$), carbon dioxide ($CO_2$) in liquid or gaseous form, and sodium bicarbonate ($NaHCO_3$), $H_2O$, and KIDDEx®. It will be appreciated that these are only exemplary type of fluids that may be used and that other fluids with similar suppression properties may equally be desirable, including but not limited to other liquefied compressed gases, inert gases, water and dry chemical extinguishing agents. Likewise, other fluids may be employed that may or may not be designed for explosion suppression applications and may be employed for other dispensing purposes.

The locking device as described provides a mechanism for locking out an explosion suppression system. More particularly, the present invention provides a lockout device for an explosion suppressor 10 that prevents inadvertent discharge of fluid. When installed in the side opening 12d of the discharge valve 12, the lockout member 14 serves as a mechanical block of the discharge path 12f. In this configuration, the explosion suppression system cannot be armed for fluid discharge. Furthermore, if the system is activated when the lockout device is installed, namely where the lockout member 14 is inserted into the side opening 12d of the discharge valve 12, dangerous pressure from the storage container 18 is not discharged. In this configuration, the lockout device improves safety to workers, and reduces storage and transportation concerns, thereby protecting system users and those in proximity of the system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. In a suppressor having a discharge valve including a load end and a discharge end, said load end and said discharge end defining a discharge path therethrough, a primary control for blocking or permitting flow through said discharge path;

a storage container connected to said discharge valve at said load end; said storage container delivering a pressurized fluid to said discharge valve through said load end when in a discharge mode; and a discharge prevention system for selectively preventing discharge of said fluid from valve when said primary control is otherwise permitting flow through said discharge path, said discharge prevention system including:
   a side opening in said discharge valve positioned spaced from said primary control and transverse of said discharge path;
   a lockout member separate from said primary control and removably insertable into said side opening, so as to mechanically block said discharge path regardless of whether said primary control is blocking or permitting flow through said discharge path, wherein said lockout member prevents inadvertent fluid discharge through said discharge end of said discharge path.

2. The suppressor according to claim 1, wherein:
said side opening of said discharge valve defining a slot transverse of said discharge path.

3. The suppressor according to claim 1, wherein:
said lockout member defining an elongated portion, said elongated portion substantially blocking said discharge path.

4. The suppressor according to claim 3, wherein:
said elongated portion defining a plate.

5. The suppressor according to claim 4, wherein:
said plate being a tongue-shaped surface.

6. The suppressor according to claim 1, wherein:
said lockout member including a securing portion, said securing portion enabling said lockout member to be removably secured to said discharge valve.

7. The suppressor according to claim 6, wherein:
said securing portion including a bolt pattern, said bolt pattern matching a bolt pattern of said discharge valve so as to secure said lockout member to said discharge valve.

8. A suppressor comprising:
   a discharge valve including a load end and a discharge end, said load end and said discharge end defining a discharge path therethrough, said discharge valve including a side opening transverse of said discharge path;
   a storage container connected to said discharge valve at said load end; said storage container delivering a pressurized fluid to said discharge valve through said load end when in a discharge mode; and
   a lockout member removably insertable into said side opening so as to mechanically block said discharge path, wherein said lockout member prevents inadvertent fluid discharge through said discharge end of said discharge path;
   a magnetic switch disposed on said discharge valve and proximate said side opening.

9. The suppressor according to claim 8, wherein:
said magnetic switch communicating with an operating member disposed at said side opening when said lockout member is not inserted into said side opening, said operating member including a magnet detectable by said magnetic switch.

10. The suppressor according to claim 9, wherein:
said magnetic switch activates when said magnet is detected so as to enable operation of said discharge valve.

11. The suppressor according to claim 9, wherein:
said operating member does not mechanically block said discharge path.

12. The suppressor according to claim 9, wherein: said operating member is disposed at said side opening only when said lockout member is removed from said side opening.

13. The suppressor according to claim 9, wherein:
said magnet being disposed in a position detectable by said magnetic switch.

14. A suppressor comprising:
   a discharge valve including a load end and a discharge end, said load end and said discharge end defining a discharge path therethrough, said discharge valve including a side opening transverse of said discharge path;
   a storage container connected to said discharge valve at said load end; said storage container delivering a pressurized fluid to said discharge valve through said load end when in a discharge mode; and
   a lockout member removably insertable into said side opening, so as to mechanically block said discharge path, wherein said lockout member prevents inadvertent fluid discharge through said discharge end of said discharge path;
   a lockout cable connectable to said lockout member to retain said lockout member in said side opening, said lockout cable weaving through a hole of said lockout member and wrapping around said discharge valve.

15. A lockout device for a fire suppression system, comprising:
   a discharge valve including a load end and a discharge end, said load end and said discharge end defining a discharge path therethrough, a primary control for blocking or permitting flow through said discharge path;
   said discharge valve including a side opening positioned spaced from said primary control and transverse of said discharge path; and
   a lockout member separate from said primary control and removably insertable into said side opening, so as to mechanically block said discharge path regardless of whether said primary control is blocking or permitting flow through said discharge path, wherein said lockout member prevents inadvertent fluid discharge through said discharge end of said discharge path.

16. The device according to claim 15, wherein:
said side opening of said discharge valve defining a slot transverse of said discharge path.

17. The device according to claim 15, wherein:
said lockout member defining an elongated portion, said elongated portion substantially blocking said discharge path.

18. The device according to claim 17, wherein:
said elongated portion defining a plate, said plate being a tongue-shaped surface.

19. The device according to claim 15, wherein:
said lockout member including a securing portion, said securing portion including a bolt pattern, said bolt pattern matching a bolt pattern of said discharge valve so as to removably secure said lockout member to said discharge valve.

20. A lockout device for a fire suppression system, comprising:
   a discharge valve including a load end and a discharge end, said load end and said discharge end defining a discharge path therethrough, said discharge valve including a side opening transverse of said discharge path; and
   a lockout member removably insertable into said side opening, so as to mechanically block said discharge path, wherein said lockout member prevents inadvertent fluid discharge through said discharge end of said discharge path;

a magnetic switch disposed on said discharge valve and proximate said side opening.

21. The device according to claim 20, wherein:
said magnetic switch communicating with an operating member disposed at said side opening when said lockout member is not inserted, said operating member including a magnet detectable by said magnetic switch.

22. The device according to claim 21, wherein:
said magnetic switch activates when said magnet is detected so as to allow arming of said fire suppression system.

23. The device according to claim 21, wherein:
said operating member does not mechanically block said discharge path.

24. The device according to claim 21, wherein:
said operating member is disposed at said side opening only when said lockout member is removed from said side opening.

25. The device according to claim 21, wherein:
said magnet being disposed in a position detectable by said magnetic switch.

26. A lockout device for a fire suppression system, comprising:
a discharge valve including a load end and a discharge end, said load end and said discharge end defining a discharge path therethrough, said discharge valve including a side opening transverse of said discharge path; and
a lockout member removably insertable into said side opening, so as to mechanically block said discharge path, wherein said lockout member prevents inadvertent fluid discharge through said discharge end of said discharge path;
a lockout cable connectable to said lockout member to retain said lockout member in said side opening, said lockout cable weaving through a hole of said lockout member and wrapping around said discharge valve.

27. A method for locking out suppressors used in an explosion suppression system, comprising:
providing a discharge valve with a load end and a discharge end defining a discharge path therethrough and a primary control for blocking or permitting flow through said discharge path; and providing a storage container connected to said discharge valve at said load end; said storage container deliverable of a pressurized fluid to said discharge valve through said load end when said discharge valve is in a discharge mode; and
disposing a side opening transverse of said discharge path and spaced from said primary control;
inserting a lockout member separate from said primary control and into said side opening, said lockout member adapted to block flow of said pressurized fluid through said discharge path regardless of whether said primary control is blocking or permitting flow through said discharge path, and
mechanically blocking said discharge path with said lockout member to block pressurized fluid from discharging through said discharge path when said lockout member is inserted, wherein said lockout member prevents inadvertent fluid discharge through said discharge end of said discharge path.

28. The method according to claim 27, wherein:
said side opening of said discharge valve defining a slot transverse of said discharge path.

29. The method according to claim 27, wherein:
said lockout member defining an elongated portion, said elongated portion substantially blocking said discharge path.

30. The method according to claim 29, wherein:
said elongated portion defining a plate, said plate being a tongue-shaped surface.

31. A method for locking out suppressors used in an explosion suppression system, comprising:
providing a discharge valve with a load end and a discharge end defining a discharge path therethrough and a primary control for blocking or permitting flow through said discharge path, and providing a storage container connected to said discharge valve at said load end; said storage container deliverable of a pressurized fluid to said discharge valve through said load end when said discharge valve is in a discharge mode; and
disposing a side opening transverse of said discharge path and spaced from said primary control;
inserting a lockout member separate from said primary control into said side opening, and
mechanically blocking said discharge path when said lockout member is inserted, wherein said lockout member prevents inadvertent fluid discharge through said discharge end of said discharge path regardless of whether said primary control is blocking or permitting flow through said discharge path; and
securing said lockout member to said discharge valve, wherein said lockout member including a securing portion, said securing portion including a bolt pattern thereon, said bolt pattern matching a bolt pattern of said discharge valve so as to removably secure said lockout member to said discharge valve.

32. A method for locking out suppressors used in an explosion suppression system, comprising:
providing a discharge valve with a load end and a discharge end defining a discharge path therethrough, and providing a storage container connected to said discharge valve at said load end; said storage container deliverable of a pressurized fluid to said discharge valve through said load end when said discharge valve is in a discharge mode; and
disposing a side opening transverse of said discharge path;
inserting a lockout member into said side opening, and
mechanically blocking said discharge path when said lockout member is inserted, wherein said lockout member prevents inadvertent fluid discharge through said discharge end of said discharge path; and
disposing a magnetic switch on said discharge valve and proximate said side opening.

33. The method according to claim 32, wherein:
said magnetic switch communicating with an operating member disposed at said side opening when said lockout member is not inserted, said operating member including a magnet detectable by said magnetic switch.

34. The method according to claim 33, wherein:
said magnetic switch activates when said magnet is detected so as to enable operation of said suppressor.

35. The method according to claim 33, wherein:
said operating member does not mechanically block said discharge path.

36. The method according to claim 33, wherein:
said operating member is disposed at said side opening only when said lockout member is removed from said side opening.

37. The method according to claim 33, wherein:
said magnet being disposed in a position detectable by said magnetic switch.

38. A method for locking out suppressors used in an explosion suppression system, comprising:
providing a discharge valve with a load end and a discharge end defining a discharge path therethrough, and providing a storage container connected to said discharge valve at said load end; said storage container deliverable of a pressurized fluid to said discharge valve through said load end when said discharge valve is in a discharge mode; and disposing a side opening transverse of said discharge path;

inserting a lockout member into said side opening, and mechanically blocking said discharge path when said lockout member is inserted, wherein said lockout member prevents inadvertent fluid discharge through said discharge end of said discharge path; and connecting a lockout cable to said lockout member so as to retain said lockout member in said side opening, said lockout cable weaving through a hole of said lockout member and wrapping around said discharge valve.

* * * * *